(12) United States Patent
Kutsch et al.

(10) Patent No.: US 11,374,390 B2
(45) Date of Patent: *Jun. 28, 2022

(54) EXPLOSION-PROOF ASSEMBLY AND METHOD FOR PRODUCING SAME

(71) Applicant: R. STAHL Schaltgeräte GmbH, Waldenburg (DE)

(72) Inventors: Maxim Kutsch, Heilbronn (DE); Fabian Roll, Untermuenkheim (DE)

(73) Assignee: R. STAHL Schaltgeräte GmbH, Waldington (DK)

( * ) Notice: Subject to any disclaimer, the term of this patent is extended or adjusted under 35 U.S.C. 154(b) by 54 days.

This patent is subject to a terminal disclaimer.

(21) Appl. No.: 15/748,521

(22) PCT Filed: Jul. 5, 2016

(86) PCT No.: PCT/EP2016/065817
§ 371 (c)(1),
(2) Date: Jan. 29, 2018

(87) PCT Pub. No.: WO2017/016817
PCT Pub. Date: Feb. 2, 2017

(65) Prior Publication Data
US 2018/0219367 A1    Aug. 2, 2018

(30) Foreign Application Priority Data
Jul. 28, 2015   (DE) .......................... 102015112285.5

(51) Int. Cl.
*H02G 15/013*   (2006.01)
*H02G 3/22*   (2006.01)
(Continued)

(52) U.S. Cl.
CPC ........... *H02G 15/013* (2013.01); *H02G 3/088* (2013.01); *H02G 3/22* (2013.01); *H02G 3/0625* (2013.01)

(58) Field of Classification Search
CPC .... H01B 17/58; H01B 17/583; H01B 17/308; H01R 13/527; H02G 3/22; H02G 3/0625;
(Continued)

(56) References Cited

U.S. PATENT DOCUMENTS 3,605,076 A * 9/1971 Dozier ................ H01B 17/306
174/153 R
5,091,605 A * 2/1992 Clifford .................. H02G 3/22
174/151

(Continued)

FOREIGN PATENT DOCUMENTS

CN       1338585 A    3/2002
CN       1395522 A    2/2003
(Continued)

*Primary Examiner* — Paresh Paghadal
(74) *Attorney, Agent, or Firm* — Leydig, Voit & Mayer, Ltd

(57) ABSTRACT

The invention relates to an explosion-proof assembly (20) designed to guide at least one conductor device (21) through a wall in a flameproof manner. The assembly (20) has a bushing part (24) with a bushing opening (48) having a bushing surface (49). The bushing part (24) is arranged in the wall. The bushing opening (48) has an associated connecting body (23) with at least one conductor channel (29) through which a conductor device (21) extends. The connecting body (23) has a connecting portion (30), which is connected to the conductor (22) in a frictionally engaged and/or form-fitting manner by plastic deformation. A first delimiting surface (32) is formed on the plastically deformed connecting portion (30), and the bushing surface (49) defines a second delimiting surface (33). A flameproof Ex gap (34) is formed between the two delimiting surfaces (32, 33) by inserting the connecting portion (30) into the bushing opening (48).

11 Claims, 6 Drawing Sheets

(51) Int. Cl.
*H02G 3/08* (2006.01)
*H02G 3/06* (2006.01)

(58) Field of Classification Search
CPC ........ H02G 3/088; H02G 15/013; H02B 1/28; H01H 9/042
See application file for complete search history.

(56) References Cited

U.S. PATENT DOCUMENTS

| | | | | |
|---|---|---|---|---|
| 5,213,520 | A * | 5/1993 | Casey | H01R 13/748 174/77 R |
| 5,399,807 | A * | 3/1995 | Yarbrough | H02G 3/22 174/653 |
| 6,286,373 | B1 * | 9/2001 | Lister | G01F 1/8409 439/709 |
| 7,615,715 | B2 * | 11/2009 | Hofmann | H02G 15/04 174/668 |
| 7,780,173 | B2 * | 8/2010 | Mullaney | F16L 5/08 174/77 R |
| 9,735,561 | B2 * | 8/2017 | Schwarz | H02G 3/0658 |
| 2004/0080119 | A1 * | 4/2004 | Goll | F16L 5/08 277/607 |
| 2006/0261560 | A1 * | 11/2006 | Radliff | F16L 5/08 277/345 |
| 2008/0314637 | A1 * | 12/2008 | Hofmann | H02G 15/04 174/668 |
| 2010/0059941 | A1 * | 3/2010 | Beele | F16L 5/10 277/606 |
| 2012/0281419 | A1 * | 11/2012 | Roll | F21V 5/008 362/311.02 |
| 2013/0014974 | A1 * | 1/2013 | Burke | G02B 6/4444 174/135 |
| 2013/0106060 | A1 * | 5/2013 | Beele | F16J 15/02 277/314 |
| 2015/0060445 | A1 * | 3/2015 | Mann | A62C 3/16 220/88.2 |
| 2015/0171606 | A1 * | 6/2015 | Wondrak | H02G 3/088 174/50 |
| 2015/0303675 | A1 * | 10/2015 | Schwarz | H02G 3/0658 174/77 R |

FOREIGN PATENT DOCUMENTS

| | | | | |
|---|---|---|---|---|
| CN | 101443975 | A | 5/2009 | |
| DE | 3710276 | A1 * | 10/1988 | ............. H02G 3/088 |
| DE | 3732576 | A1 | 4/1989 | |
| DE | 102009011277 | A1 | 9/2010 | |
| DE | 102011001985 | A1 * | 10/2012 | ............. H02G 3/083 |
| DE | 102012111270 | A1 * | 5/2014 | ........... H02G 3/0658 |
| DE | 102013109261 | A1 | 3/2015 | |
| EP | 0309895 | A2 * | 4/1989 | ............. H02G 3/088 |
| JP | 2003046271 | A * | 2/2003 | ............. H02G 15/013 |
| WO | WO-2011151265 | A2 * | 12/2011 | ........... H02G 15/013 |
| WO | WO-2013185979 | A1 * | 12/2013 | ............. H02G 3/088 |
| WO | WO-2014079688 | A1 * | 5/2014 | ........... H02G 3/0658 |
| WO | WO-2015106996 | A1 * | 7/2015 | ............. H02G 3/088 |

* cited by examiner

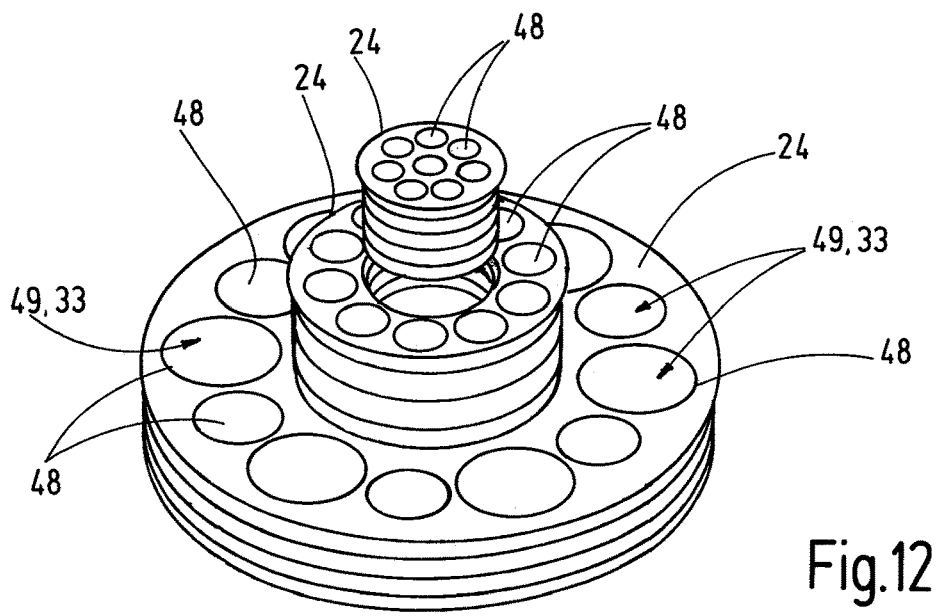
Fig. 12
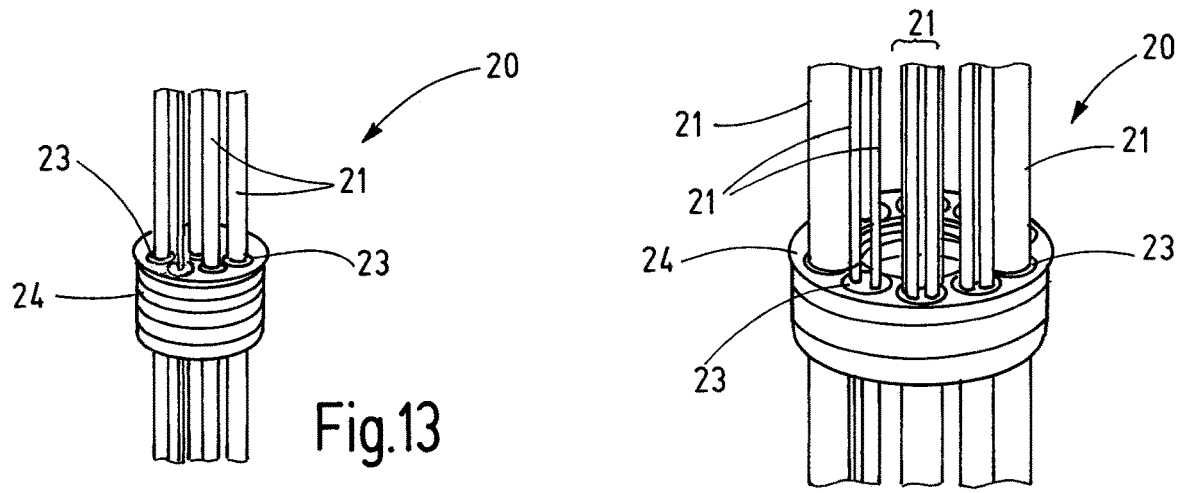
Fig. 13
Fig. 14
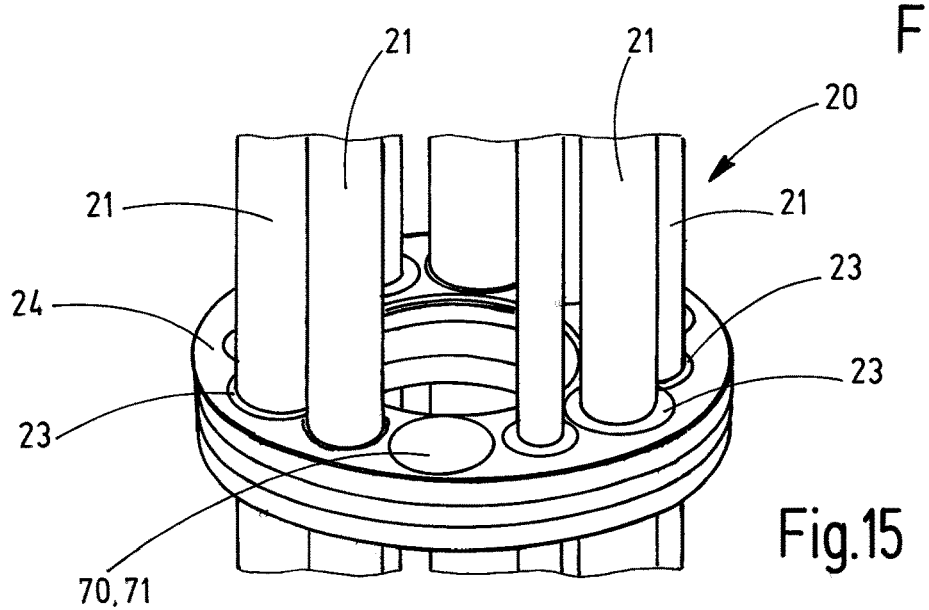
Fig. 15

EXPLOSION-PROOF ASSEMBLY AND METHOD FOR PRODUCING SAME

FIELD OF THE INVENTION

The invention relates to an explosion-proof assembly and a method for producing such assemblies.

BACKGROUND OF THE INVENTION

Explosion-proof assemblies are used to guide a conductor device with at least one electrical conductor and/or at least one optical conductor through a bushing part in an explosion-proof manner. The bushing part for example can be an integral part of a wall of an explosion-proof housing. However, the bushing part can also be an insert, which is arranged in turn in a wall of an explosion-proof housing.

The conductor device can be an electrical conductor with one or more insulated conductors.

The guiding of conductors from an atmosphere that is at risk of explosion into an explosion-proof space, for example within an explosion-proof housing, is complex. It must be ensured that there can be no ignition transmission outwardly from the explosion-proof space into the atmosphere at risk of explosion.

An explosion-proof assembly for multicore cables is known from DE 10 2012 111 270 A1. The explosion-proof assembly has a cable connection device with an outer sleeve and an inner sleeve. The sleeves are arranged coaxially relative to one another and the cable is guided through the inner sleeve. The outer sleeve has a crimping portion. This is made of plastically deformable material. The inner sleeve is elastically deformable. An elastic deformation of the inner sleeve arranged between the cable and the outer sleeve is achieved by deforming the crimping portion of the outer sleeve. Since the cable sheathing and the inner sleeve are made of elastically deformable material, a plastic material flow of the inner sleeve and of the cable sheathing is avoided, and thus there can be no setting of the material over a longer period of time. It is thus ensured that the cable is arranged in the cable connection device with flameproof gaps.

OBJECTS AND SUMMARY OF THE INVENTION

It is an object of the present invention to provide an improved explosion-proof assembly which guides a conductor device with at least one conductor through the assembly.

The explosion-proof assembly according to the invention has at least one bushing part, at least one connecting body, and at least one conductor device with at least one electrical conductor and/or at least one optical conductor. The conductor can be surrounded at least in portions by a sleeve and/or a sheathing, in particular along the conductor channel. The sleeve and/or sheathing can be used to provide electrical insulation and/or to provide protection against mechanical damage. The conductor device for example can be a conductor with one or more insulated electrical leads. It can be formed by a single conductor or a plurality of separate conductors or a cable with a plurality of leads or cores. The at least one conductor can be formed of a single wire or of a plurality of individual wires or of one or more optical fibre. The at least one conductor can also be formed by a bar or a pin or stud.

At least one bushing opening is provided in the at least one bushing part. The at least one bushing opening extends in a longitudinal direction fully through the bushing part and is delimited by a bushing surface.

A connecting body is provided for each conductor device to be guided through the bushing part or one of the provided bushing openings. Each connecting body has at least one conductor channel extending through the connecting body in the longitudinal direction. Each conductor channel of a guide body is passed through by a conductor of the conductor device. In the region of the respective conductor channel, a guided-through conductor is preferably electrically insulated by a sheathing and/or a sleeve. Exactly one conductor is preferably guided through each conductor channel.

The at least one connecting body is made of a plastically deformable material. The connecting body is preferably formed integrally, without seams or joints. A mechanical connection between the connecting body and the conductor device is produced by plastically deforming a connecting portion of the connecting body, said conductor device being guided through the at least one conductor channel. The mechanical connection is produced by frictional engagement and optionally additionally by a form fit. During the plastic deformation of the connecting portion, the material of the connecting body presses outwardly against the conductor device or each conductor of the conductor device, which is guided through one of the provided conductor channels.

A particular feature of the explosion-proof assembly according to the present invention lies in the fact that when the connecting body is connected in a frictionally engaged manner to the conductor device as a result of the plastic deformation of a portion outer surface of the connecting portion, a first delimiting surface is formed. This first delimiting surface and an associated bushing surface of an associated bushing opening, in the bushing part, form an Ex gap resistant to ignition transmission. Following the connection of the connecting body to the conductor device by the plastic deformation, it is therefore sufficient to arrange the connecting body with the first delimiting surface in the bushing opening. The outer dimensions of the first delimiting surface are adapted to the inner dimensions of the bushing surface, so that the flameproof Ex gap is formed by the arrangement of the connecting body or the connecting portion thereof in the bushing opening and in particular by insertion of the connecting body into the bushing opening in the longitudinal direction. This assembly can be produced very easily, economically and quickly.

The plastic deformation of the connecting portion is preferably produced by the action of a mechanical force onto the connecting portion from outside.

An integrally bonded connection between the connecting body and the conductor device is preferably not provided. The plastic deformation of the connecting body is achieved in particular by a forming process, such as extrusion or impact extrusion or rolling.

The connecting body is made of a material containing metal, in particular of steel or a steel alloy. The bushing part can also be produced from a material containing metal or from steel. Alternatively, it can also be produced from plastic. The bushing part is preferably formed by a moulded part.

It is advantageous if the connecting body rests directly and without a flamegap against the conductor or the sheathing. Further intermediate layers between the at least one conductor device and the connecting body are not necessary. It is possible, however, to additionally provide a sleeve, in particular a plastic sleeve, for pressure distribution, which sleeve surrounds the conductor or sheathing thereof.

Merely one conductor with a single sheathing or sleeve surrounding this conductor is preferably guided through each provided conductor channel. A cable with a plurality of conductors can be freed of the outer casing in order to be guided through, and the individual cores can each be guided with the aid of a connecting body through respective associated bushing openings. The cable can also be guided as a whole with its sheathing surrounding the cores through an associated bushing opening by means of a single connecting body.

It is advantageous if the flameproof Ex gap is embodied as an air gap. A filling, for example by a moulded material or adhesive, is spared. It is thus possible to separate the connection between the connecting body and the bushing part in a destruction-free manner.

It is additionally advantageous if the first delimiting surface of the plastically deformed deformation portion and the bushing surface are each embodied as surfaces without indentations and protrusions. The surfaces are embodied as flat surfaces so to speak. In particular, the two delimiting surfaces can be thread-free. The Ex gap provided in this embodiment has the contour of an annular gap that is fully or partially closed in the circumferential direction. If the first delimiting surface and the second delimiting surface are arranged coaxially relative to one another, a hollow-cylindrical Ex gap is produced. Grooves or indentations can be provided adjacently to the Ex gap or the delimiting surfaces, for example in order to receive securing elements and/or seals.

The cross-sectional contours of the connecting body or of the connecting portion and of the bushing opening are adapted to one another in order to form the Ex gap. The outer dimensions of the first delimiting surface of the plastically deformed connecting portion are preferably slightly smaller than the inner dimensions of the bushing surface, so that the connecting portion can be arranged easily in the bushing opening without forming a press fit. Here, the cross-sectional shapes can be selected arbitrarily in principle. The first delimiting surface and the bushing surface or second delimiting surface can thus have a polygonal, oval, elliptical or any other cross-section. It is preferred if both of the two delimiting surfaces each have a circular cross-section.

In another exemplary embodiment of the explosion-proof assembly, it can also be advantageous if the first delimiting surface is formed with an outer thread and the bushing surface or the second delimiting surface is formed with an inner thread, which can be connected to said outer thread. The Ex gap in this exemplary embodiment is formed at least in portions as a threaded gap. It is possible to screw the connecting body into the bushing opening, so that said connecting body is also secured against undesirable relative movements in the longitudinal direction.

It is also advantageous if the connecting portion extends substantially over the entire length of the connecting body in the longitudinal direction. This is understood to mean a connecting portion of which the length in the longitudinal direction is at least 70% or at least 80% or at least 90% of the total length of the connecting body. In one exemplary embodiment the connecting body, in addition to the connecting portion, also has only an axial end portion at one axial end or both axial ends, which axial end portion for example forms a chamfer in each case. In order to produce the mechanical connection to the conductor assembly, substantially the entire connecting body is thus plastically deformed. For example, the connecting body can be deformed by extrusion or impact extrusion or rolling and thus mechanically connected to the associated conductor device, this being very simple and economical.

It is also advantageous if a securing device is provided. The securing device is designed to secure the connecting body at the bushing part against an undesirable relative movement in the longitudinal direction. In particular, it is thus ensured that the deformation portion with the first delimiting surface does not leave the bushing opening, so that the length of the Ex gap in the longitudinal direction is maintained. In one exemplary embodiment the securing device can have at least one securing part that can be elastically deformed radially outwardly, for example a snap ring. At the opposite end of the bushing opening, the securing device can have a rigid axial stop at the bushing part. The connecting body can be secured by the axial stop and the securing part against an undesirable movement in the longitudinal direction relative to the bushing part.

It is additionally advantageous if the connecting body has a chamfer at least at one axial end. The chamfer is preferably provided only at the axial end associated with the bushing opening of the bushing part prior to the insertion of the connecting body in the longitudinal direction. The securing part, for example the snap ring, can thus be splayed open as the connecting body is inserted into the bushing opening and enables the connecting portion to be inserted into the bushing opening easily and without the use of tools.

In one embodiment the entire securing device can be an integral part of the bushing part and can engage around the connecting body on both axial sides so to speak. The bushing part in this embodiment can be formed for example by two shells which can be connected to one another and which, following connection thereof, secure the connecting body against a movement in the longitudinal direction. The shells each have a circumferential portion of the bushing surface and form the bushing opening when they are connected to one another in such a way that the circumferential portions supplement one another to form the bushing surface, which is closed in the circumferential direction.

It is additionally advantageous if the bushing part has a plurality of bushing openings. Here, a connecting body can be arranged at least in one of the provided bushing openings, thus forming the Ex gap. In bushing openings of this kind in which there is no connecting body arranged, there can be arranged a closure means, for example in the form of a closure stopper, so as to close the respective bushing opening. Instead of the closure stopper, other closure means can also be used. The closure stopper can be arranged in the bushing opening in a frictionally engaged and/or form-fitting manner. Here, it is possible to insert or remove a closure stopper as necessary.

It is additionally advantageous if a plurality of bushing parts connected or connectable to one another are provided. Each of the bushing parts can comprise one or more bushing openings. The bushing parts can be circular or annular and for example can be arranged concentrically relative to one another. Depending on the number of guide devices to be guided through, it is thus possible to connect one or more bushing parts to one another and for example to insert these in a housing wall. As a result of the connection of a plurality of bushing parts to one another, it is sufficient to provide just one aperture in the housing wall. The bushing parts connected to one another occupy a continuous area, preferably without constrictions, extending at right angles to the longitudinal direction, the contour of said area for example being circular, elliptical, oval or polygonal.

In one embodiment of a bushing part with a plurality of bushing openings, it is also advantageous if some of the bushing openings have opening cross-sections that differ from opening cross-sections of other bushing openings. For example, bushing openings with differently sized, predefined or standardised open cross-sections or opening diameters can be provided.

It is additionally advantageous if, for a bushing opening with a predefined opening cross-section, there are provided a plurality of matching connecting bodies, with an outer cross-section adapted to said cross-section, wherein the at least one conductor channel of a matching connecting body differs from the at least one conductor channel of other matching connecting bodies. For example, the matching connecting bodies can each have a different number of conductor channels and/or the conductor channels of various matching connecting bodies can have different contours or area contents of the channel cross-sections. Conductor devices of different type or with different cross-section can thus be inserted into a specific bushing opening with use of the matching connecting body.

By providing one or more bushing parts each with a plurality of bushing openings of different size and/or by providing a plurality of matching connecting bodies for each bushing opening, a modular system can be constructed in which a multiplicity of conductor devices can be easily and quickly guided, in a versatile manner, through a wall portion in an explosion-proof manner.

The explosion-proof assembly can be produced as follows:

Firstly, a bushing part with at least one bushing opening is provided. The bushing opening is delimited in the circumferential direction by a respective bushing surface. In addition, at least one connecting body made of a plastically deformable material is provided. Each connecting body has at least one conductor channel extending through the connecting body in the longitudinal direction.

A conductor device with at least one electrical and/or optical conductor is guided through the respective associated conductor channel of the connecting body. The connecting body is then plastically deformed in the region of its connecting portion. The plastically deformed outer surface in the connecting portion of the connecting body can be used as a first delimiting surface or can be further processed, after the plastic deformation, to form the first delimiting surface, for example by the forming of a thread. The cross-sectional area in the connecting portion or of the first delimiting surface is reduced during the plastic deformation. The connecting body is connected to the conductor device as a result of the plastic deformation. This connection is frictionally engaged and optionally additionally form-fitting.

Following the establishment of the mechanical connection between the connecting body and the conductor device, the connecting portion or the entire connecting body is arranged in the bushing opening. The bushing surface of the bushing opening constitutes a second delimiting surface, wherein a flameproof Ex gap is formed between the two delimiting surfaces.

The connecting body can then be secured against an undesirably great movement relative to the bushing part in the longitudinal direction. This securing effect can also be produced already during the arrangement of the connecting portion in the bushing opening, for example when an outer thread is provided on the first delimiting surface and an inner thread is provided on the bushing surface and the two threads are screwed in one another, whereby an Ex gap is produced in the form of a threaded gap.

The plastic deformation of the connecting portion or of the connecting body is achieved preferably by extrusion or impact extrusion or rolling.

Other objects and advantages of the invention will become apparent upon reading the following detailed description and upon reference to the drawings.

BRIEF DESCRIPTION OF THE DRAWINGS

FIG. 12 is a perspective of an exemplary embodiment of three bushing parts connected to one another, FIG. 13-15 each show exemplary embodiments of explosion-proof assemblies for use of the bushing parts shown FIG. 12.

Figure 1:
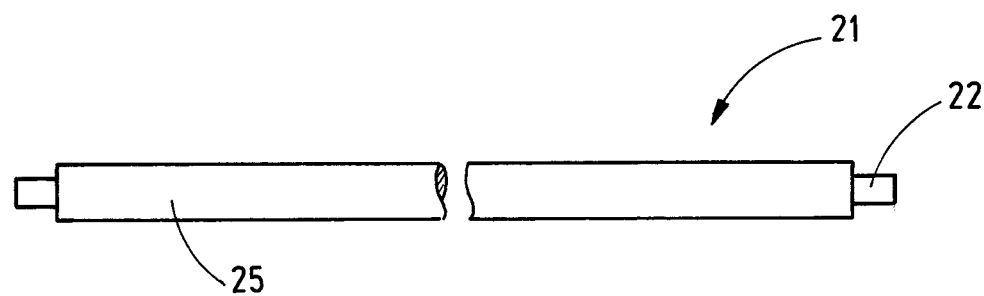
FIG. 1 is a schematic of an exemplary conductor device used in an explosion-proof assembly in accordance with the invention, FIG. 2 are side and end views of an exemplary embodiment of a connecting body in its non-deformed starting state prior to deformation.
Figure 2:
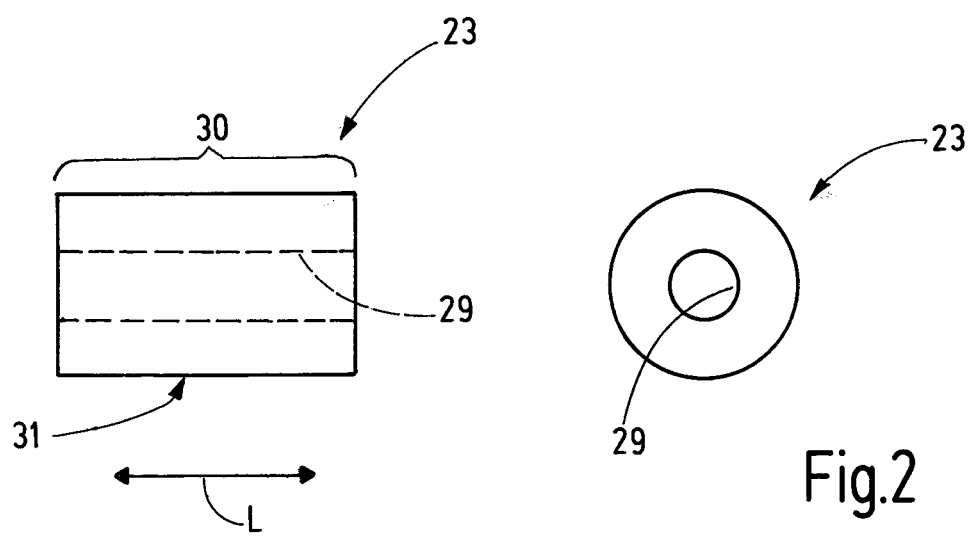
Figure 3:
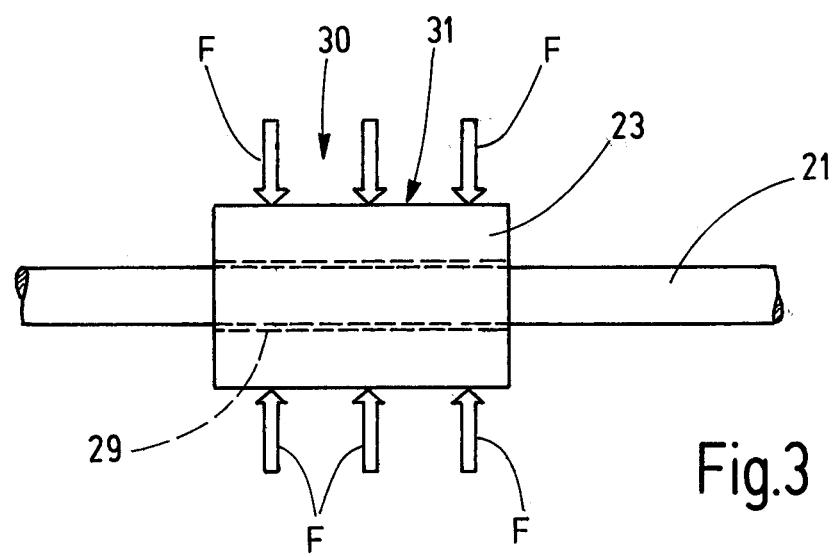
FIG. 3 is a schematic depiction of the connection of the connecting body shown in FIG. 2 with the conductor device shown in FIG. 1, FIGS. 4a and 4b show a tool device and an exemplary method for producing a connection between a connecting body and a conductor device.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now particularly to the drawings, and specifically to FIGS. 6, 9-11, and 13-17, there are shown exemplary embodiments of an explosion-proof assembly 20 in accordance with the invention. The explosion-proof assembly 20 comprises a conductor device 21 with at least one conductor 22, at least one connecting body 23, and at least one bushing part 24. At least one optical conductor 22 can also be provided additionally or alternatively to the at least one electrical conductor 22, although this is not depicted in the exemplary embodiments.

The explosion-proof assembly 20 is used to guide the conductor device 21 with the at least one conductor 22 in an explosion-proof manner through a wall or a wall portion which separates an explosion-proof space or region from an atmosphere that is at risk of explosion. For example, the wall portion may be a wall portion of an explosion-proof housing, in particular a flameproof encapsulation (Ex d). For this purpose, the bushing part 24 can be an integral part of the wall or can be mounted in the wall in a flameproof manner as a separate component, for example by means of a threaded connection and/or an integrally bonded connection (adhesive bonding, welding, etc.).

In the explosion-proof assembly 20, each conductor device 21 provided is associated with a connecting body 23. The conductor device 21 can be a conductor with a single conductor or with a plurality of conductors 22. The conductor 22, which in accordance with the example is an electrical conductor, can be embodied as a one-piece wire or can be formed from a plurality of wires in the form of a stranded wire. The at least one electrical conductor 22 is insulated at least in portions with the aid of an electrically insulating sheathing 25 and/or a sleeve. The at least one conductor 22 can also be formed by a rigid stud which—in contrast to electrical conductors or cables—cannot be bent in a flexible manner transversely to its direction of extent by the transverse forces usually occurring.

The conductor device 21 with the at least one electrical conductor 22 is associated in each case with a connecting body 23. The connecting body 23 comprises at least one conductor channel 29 extending fully through the connecting body 23 in a longitudinal direction L. The conductor channel 29 serves to receive a portion of the associated conductor device 21. The conductor device 21 is for this purpose inserted via its free end into the conductor channel 29 in the longitudinal direction L and is guided through fully. The contour of the conductor channel 29 is adapted to the outer contour of the conductor device 21. In order to guide through an electrical conductor or an electrical cable, the conductor channel 29 in accordance with the example has a circular cross-sectional contour. In principle, however, any other cross-sectional contours without vertices or with vertices can be provided.

The connecting body 23 has a connecting portion 30. In the exemplary embodiment according to FIGS. 2, 3, 5, 6 and 11 the connecting portion 30 extends substantially over the entire length of the connecting body 23 in the longitudinal direction L. In the length portion of the connecting body 23 forming the connecting portion 30, the connecting body 23 is plastically deformed by the action of a mechanical force. As a result of this plastic deformation, the conductor channel 29 also deforms in the region of the connecting portion 30 and rests in an ignition-gap-free manner against the conductor device 21 guided through the conductor channel 29 or against the sheathing 25 or the conductor 22 of the conductor device 21. It is preferred if each conductor 22 of the conductor device 21 is guided through a separate conductor channel 29 of the connecting body 23. If a conductor device 21 has a plurality of separate conductors 22, the connecting body 23 can thus have a corresponding number of conductor channels 29. Exemplary embodiments for this are depicted schematically in FIGS. 14, 16 and 17.

A sleeve, for example a plastic sleeve, can additionally be arranged between the conductor 22 and the conductor channel 29. The sleeve can be used to more uniformly distribute the force acting on the conductor 22 during and after the plastic deformation of the connecting portion 30. The sleeve can also be used to adapt a cross-sectional contour of a conductor to the cross-sectional shape of the conductor channel 29.

The outer surface of the connecting portion 30 of the connecting body 23 is referred to as a portion outer surface 31. A deformation force F is exerted into this portion outer surface 31 and is illustrated highly schematically in FIG. 3. The portion outer surface 31 thus obtains its desired contour, and the connecting portion 30 thus obtains its desired cross-sectional dimensions or, in accordance with the example, the desired outer diameter. The plastically deformed portion outer surface 31, after its plastic deformation or forming during and as a result of the production of the mechanical connection to the associated conductor device 21, is referred to as a first boundary surface 32.

Figure 7:
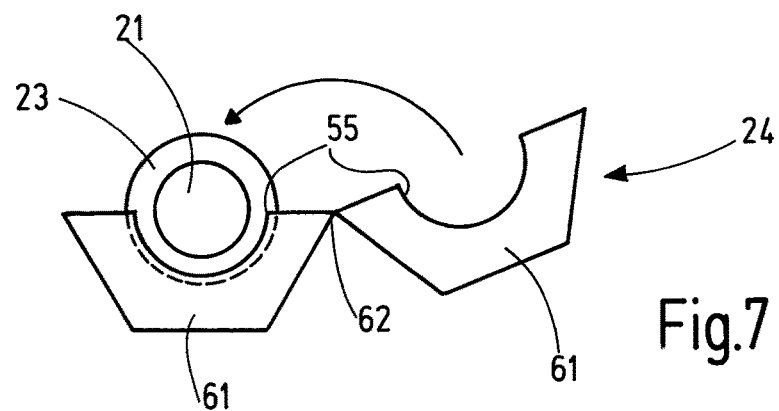
FIG. 7 is an end view of an exemplary embodiment of a bushing part.
Figure 8:
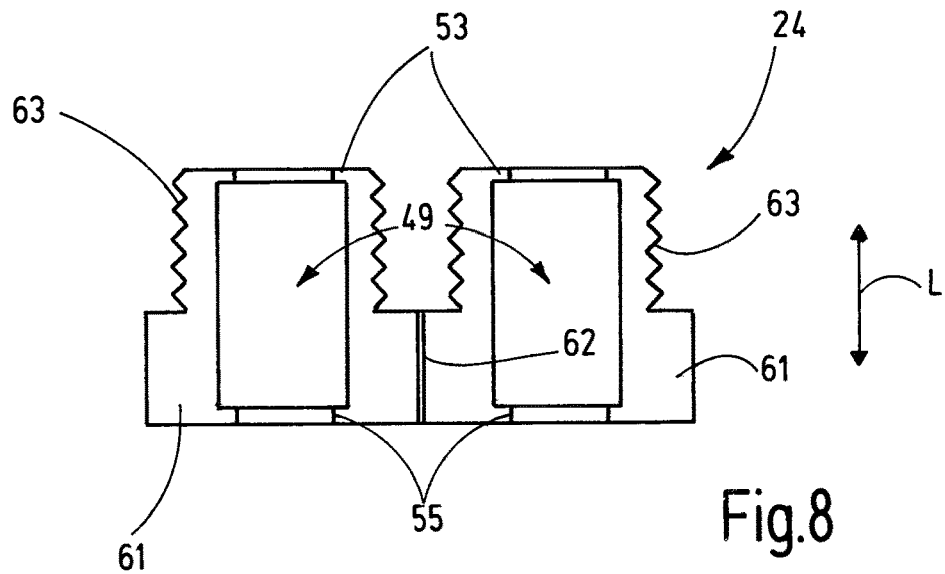
FIG. 8 is a plan view of the bushing part shown in FIG. 7, FIG. 9-11 are depictions of exemplary embodiments of the explosion-proof assembly.
Figure 9:
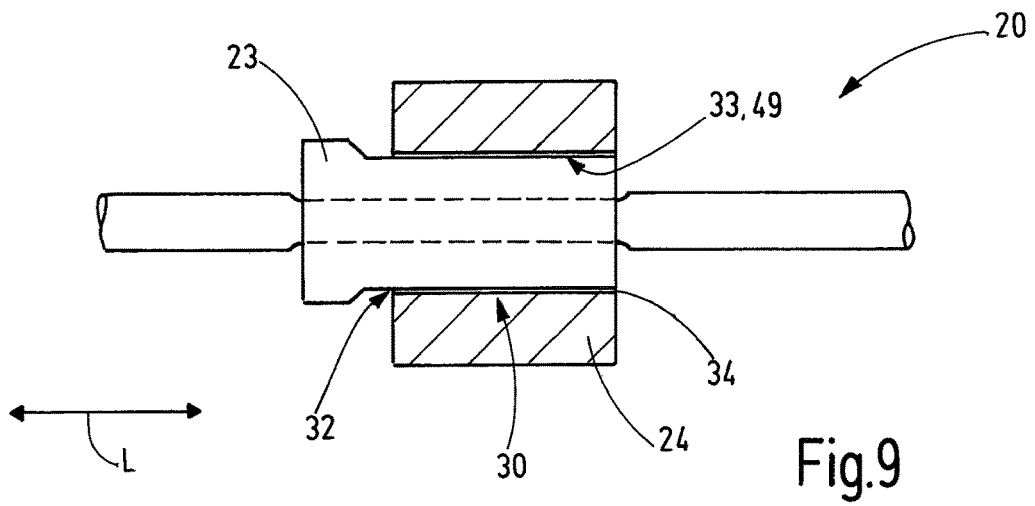

In other exemplary embodiments it is also possible that the connecting body 23, in addition to the deformation portion 30, has a connecting portion 31 (FIGS. 7, 8 and 9). This connecting portion 31 is not used for frictionally engaged connection to the conductor device 21. It can remain non-deformed at the time of the plastic deformation of the deformation portion 30.

The first delimiting surface 32 at the connecting body 23 and a second delimiting surface 33, cooperating with the first delimiting surface 32, at the bushing part 24 jointly delimit a flameproof Ex gap 34.

FIG. 4a illustrates a variant by means of which the connecting portion and substantially the entire connecting body 23 can be connected mechanically to the associated conductor device 21 by deformation and the first delimiting surface 32 at the portion outer surface 31 of the connecting portion 30 can be formed by the deformation operation. In this exemplary embodiment the connecting portion 30 extends practically over the entire length of the connecting body.

The connecting body 23 is formed in accordance with FIG. 4a by extrusion or impact extrusion and in particular by direct extrusion. This process is illustrated in a heavily schematic manner in FIG. 4a. The connecting body 23 and the conductor device 21 guided through the conductor channel 29 are arranged in a mould 38. The mould 38 for this purpose has a deformation channel 39, the cross-section of which at a first end 40 is adapted to the outer cross-section of the connecting portion 30, which has not yet been deformed. The portion outer surface 31 rests against the inner surface of the deformation channel 39 with a small amount of play in the circumferential direction. With the aid of a ram 41, the connecting body 23 is moved along the deformation channel 39, away from the first end 40. The channel cross-section of the deformation channel tapers, causing a material flow. The length of the connecting body 23 increases in the longitudinal direction L, whereas the cross-sectional dimensions in the connecting portion 30 decrease.

Figure 4B:
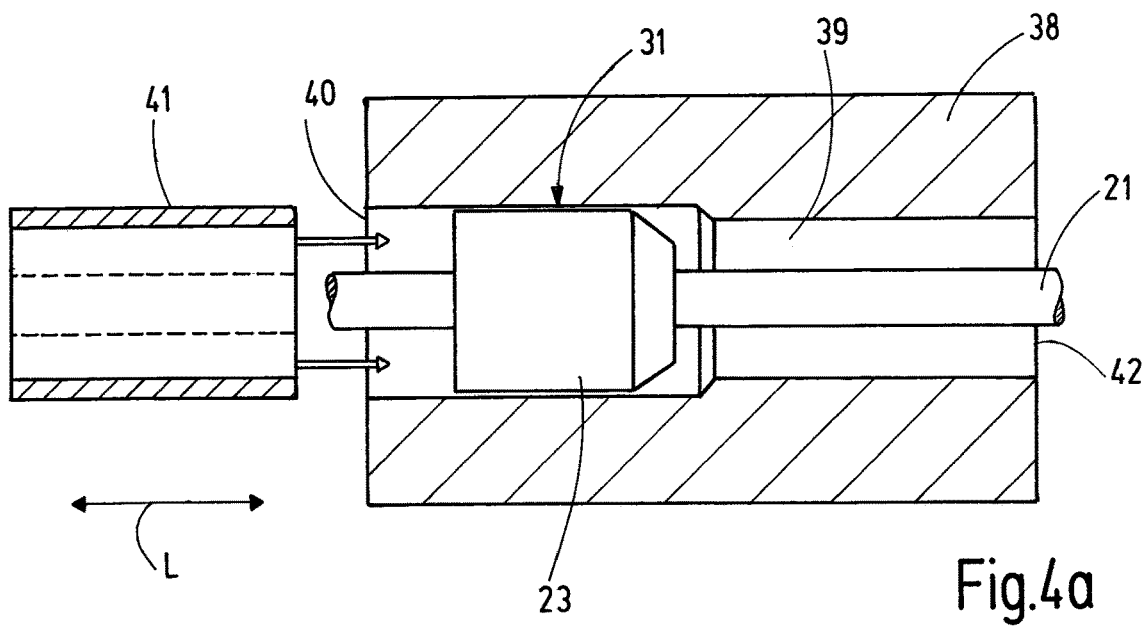
Figure 4B:
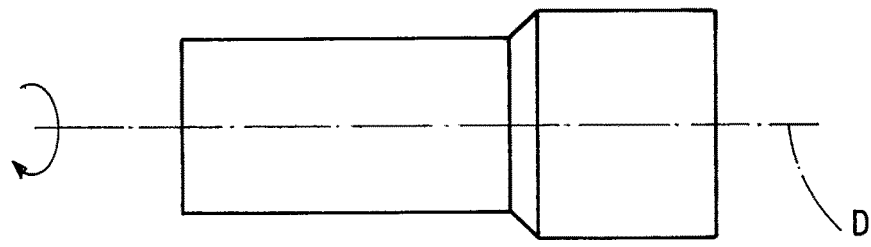
Figure 5:
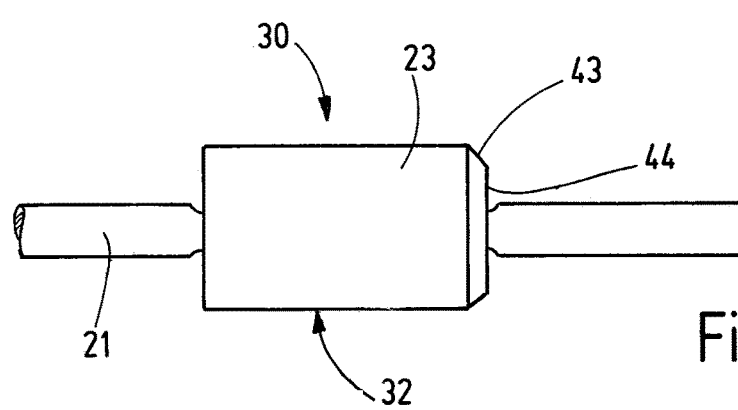
FIG. 5 is a side view of a structural unit from an exemplary embodiment of a connecting body and conductor device.

In the exemplary embodiment described here the first connecting portion 31 obtains a circular cylindrical shaping, so that the first delimiting surface 32 is formed by a circular cylinder lateral surface (FIG. 5). The ram 41 can comprise two ram parts arranged concentrically relative to one another (FIG. 4a) so as to move the connecting body 23 completely through the narrow point in the deformation channel 29 and for example also to completely press said connecting body through the deformation channel 29 in a single direction. Alternatively, it is also possible to provide an ejector at the second end 42 of the deformation channel 39 opposite the first end 40, which ejector moves the plastically deformed connecting body 23 back in the direction of the first end 40 and out from the mould 38.

The plastic deformation of the connecting portion 31 of the connecting body 23 can also be performed by rolling of the connecting portion 31 between two rolling tools 37—as illustrated schematically in FIG. 4*b*. Rollers that rotate about respective axes of rotation D are illustrated in FIG. 4*b* as rolling tools by way of example. The degree of deformation of the connecting portion 31 can be predefined by the distance between the two axes of rotation D. Alternatively to the use of rollers, the connecting portion 41 could also be rolled between two planar rolling tools, the distance between which predefines the degree of deformation and which move relative to one another in parallel alignment, so that the connecting portion 31 is rolled between the planar rolling tools.

Figure 6:
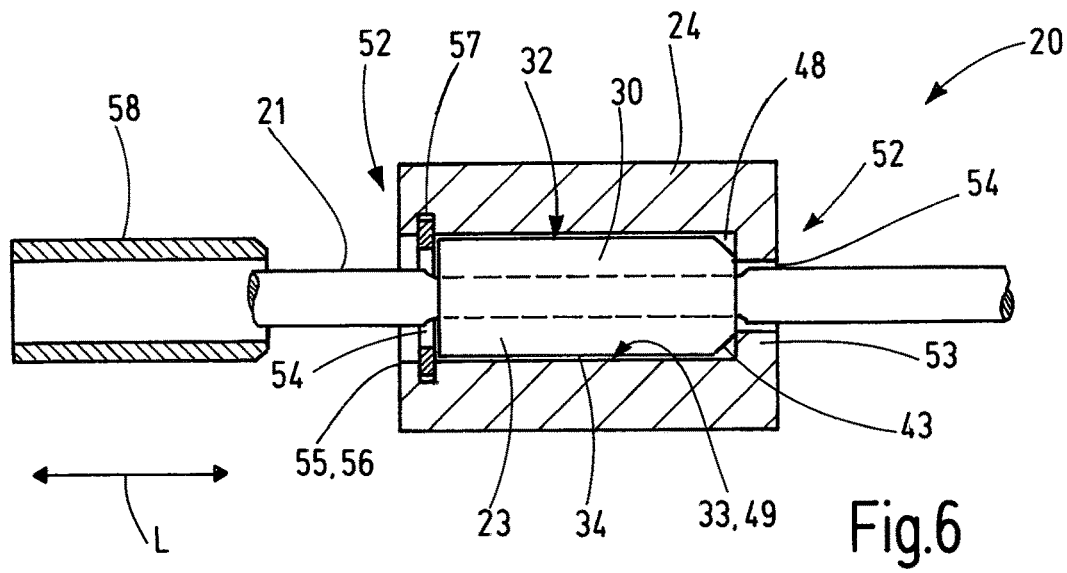
FIG. 6 is a schematic depiction of an exemplary embodiment of an explosion-proof assembly with the structural unit shown in FIG. 5.

An embodiment of the connecting body 23 which comprises a chamfer 43 adjacently to the first delimiting surface 32 of the connecting portion 30 is illustrated in FIGS. 5 and 6. The chamfer 43 on the one hand directly adjoins the first delimiting surface 32 and on the other hand directly adjoins an end face 44 of the connecting body 23 that extends at an inconductor or at right angles to the longitudinal direction L and constitutes an axial end of the connecting body 23. The end face 44 is embodied in the exemplary embodiment as a flat annular face and surrounds a mouth of the conductor channel 29. In this exemplary embodiment the connecting body 23 consists exclusively of two length portions, specifically an axial end portion formed by the chamfer 43 and the connecting portion 30 with the first delimiting surface 32 in the form of a cylinder lateral surface. The connecting portion 30 thus extends substantially over the entire length of the connecting body 23. This is to be understood to mean that the length of the connecting portion 30 accounts for the greatest part of the total length of the connecting body, for example at least 70%, 80% or 90%, and in accordance with the example additionally merely the chamfer 43 is provided.

In the case of the exemplary embodiment described here, the entire connecting body 23 is made of a plastically deformable material and is produced integrally, without seams or joints. In a variation, it could be sufficient in exemplary embodiments of the connecting body 23 if the connecting portion 30 is made of a plastically deformable material. In accordance with the example the connecting body 23 is produced from a metal or a metal alloy and preferably from steel. In order to avoid an electrical connection to the at least one conductor 22, the electrical insulation in accordance with the example is provided by the sheathing 25, at least in the region of the conductor channel 29.

As explained, a mechanical and in accordance with the example frictionally engaged connection is produced between the connecting body 23 and the associated conductor device 21 by the plastic deformation of the connecting portion 30. Optionally, a form-fitting connection can also be created here, this being dependent on the shaping of the conductor device 21 or of the sheathing 25. The optional sheathing 25 can be elastically deformable and for example can be made of plastic. As a result of the mechanical, frictionally engaged and/or form-fitting connection between the connecting body 23 and the conductor device 21, the channel inner surface delimiting the conductor channel 29 rests preferably directly against the sheathing 25 of the conductor device 21 or against a sleeve surrounding the conductor 22. The sheathing 25 is preferably formed by a single layer, which surrounds the associated conductor 22.

Multi-core cables for example can be freed of their cable sheathing, and the insulated cores can each be guided separately through a conductor channel 29 of the connecting body 23, if this is necessary for reasons related to providing protection against explosion. Depending on the used cable, the number of cores, the materials, etc., however, a single connecting body can be arranged on the cable sheathing surrounding the cores and can be connected thereto in a flameproof manner and guided through a bushing opening 48.

The bushing part 24 has a bushing opening 48, which is delimited in the circumferential direction by a bushing surface 49. The bushing surface 49 forms the second delimiting surface 33 for forming the Ex gap 34. By arranging the connecting body 23 or the connecting portion 30 with the first delimiting surface 32 in the bushing opening 48 with the bushing surface 49, the delimiting surfaces 32 and 33 facing one another delimit the Ex gap 34. An example of such an arrangement is shown in FIG. 6. The Ex gap 34 is formed there as an annular gap between the first delimiting surface 32 of the connecting body 23 and the second delimiting surface 33 of the bushing opening 48.

The Ex gap 34 is preferably an air gap. In accordance with the example there is no integrally bonded connection between the connecting body 23 and the bushing part 24.

To axially secure the connecting body 23 in the bushing opening 48, a securing device 52 can be provided. In the exemplary embodiment according to FIG. 6 the securing device 52 includes a first stop 53, which delimits the bushing opening 48 in the longitudinal direction L at one end and protrudes radially inwardly. The first stop 53 has a hole 54 for guiding through the conductor device 21. The dimensions of the hole 54 are selected so that the connecting body 23 does not pass through and is delimited with regard to its axial movement in the longitudinal direction L by the stop 53. On the side opposite the first stop 53, the bushing opening 48 is delimited by a second stop 55 of the securing device 52. The distance in the longitudinal direction L between the two stops 53, 55 is at least as great as the length of the connecting portion 30 of the connecting body 23. In the exemplary embodiment according to FIG. 6 the connecting body 23 is disposed completely between the two stops 53, 55. In a variation, at least part of the connecting body could also protrude beyond at least one of the two stops 53, 55 in the longitudinal direction L.

Similarly to the first stop 53, the second stop 55 also has a hole 54 for guiding through the associated conductor device 21. The second stop 55 in accordance with the example is formed by a body which is deformable or expandable radially to the longitudinal direction L and in accordance with the example by a snap ring 56. The snap ring 56 is C-shaped and is not completely closed in the circumferential direction about the longitudinal direction L, but is slotted at a point, so that it can be expanded in order to allow the connecting body 23 to be passed through. In its non-expanded rest state, it delimits a hole 54, the cross-sectional dimension of which is smaller than that of the connecting body 23 or the connecting portion 30, so that it can limit the axial movement in the longitudinal direction L of the connecting body 23. The snap ring 56 sits in a circumferential groove 57 of the guide-through part 24, which is open radially inwardly. The snap ring 56, in its non-expanded starting state, protrudes radially inwardly from the circumferential groove 57. In order to expand the snap ring 56, said ring sits in the circumferential groove 57 with play.

In this embodiment the provision of the chamfer 43 on the connecting body 23 is advantageous. The snap ring 56 can be radially widened via the chamfer 43 as the connecting body 23 is inserted into the bushing opening 48 and can slide along the connecting portion 30 or the first delimiting surface 23 during the further insertion process. If the connecting portion 30 or the connecting body 23 is fully inserted, the snap ring 56 no longer rests against the first delimiting surface 32 and assumes its non-expanded starting state, which is shown in FIG. 6.

With the aid of a sleeve 58 or a comparable tool, the snap ring 56 can be expanded and the connecting body 23 can be removed from the bushing opening 48. The securing against axial movement via the securing device 52 is therefore embodied in accordance with the example so that the prevention of movement between the connecting body 23 and the bushing part 24 in order to limit the relative movement in the longitudinal direction L is releasable. The securing device 52 does not have to be embodied so that all relative movement is avoided. It is sufficient to limit the relative movement in such a way that the Ex gap 34 is not reduced, so as not to compromise the resistance to ignition transmission.

In FIGS. 7 and 8 a further variant of a bushing part 24 is illustrated, which has a securing device 52 with the two stops 53, 55. The bushing part 24 in this variant is formed of two shells 61 or halves, which can be connected and/or are connected to one another. In the exemplary embodiment the two shells 61 are connected to one another at a longitudinal edge by means of a film hinge 62. The film hinge 62 forms a pivot bearing point, about which both shells 61 can be pivoted relative to one another. Each shell 61 comprises a circumferential portion of the bushing opening 48 and consequently the bushing surface 49. The two stops 53, 55 are also each provided in part on each of the two shells 61. In accordance with the example a semi-circular part of each stop 53, 55 is provided on each shell 61. The connecting body 23 with the conductor device can be placed in the folded-open state in one of the shells 61. The two shells 61 can then be arranged against another by means of a pivot movement (FIG. 7), such that the respective portions of the bushing surface 49 or of the stops 53, 55 supplement one another and the bushing surface 49 is closed in the circumferential direction about the connecting portion 30 or the entire connecting body 23, whereby the Ex gap 34 is formed and the explosion-proof assembly 20 is produced.

The bushing part 24 according to FIGS. 7 and 8 can have a thread 63 so as to screw the explosion-proof assembly 20 into a threaded hole of a wall.

Figure 10:
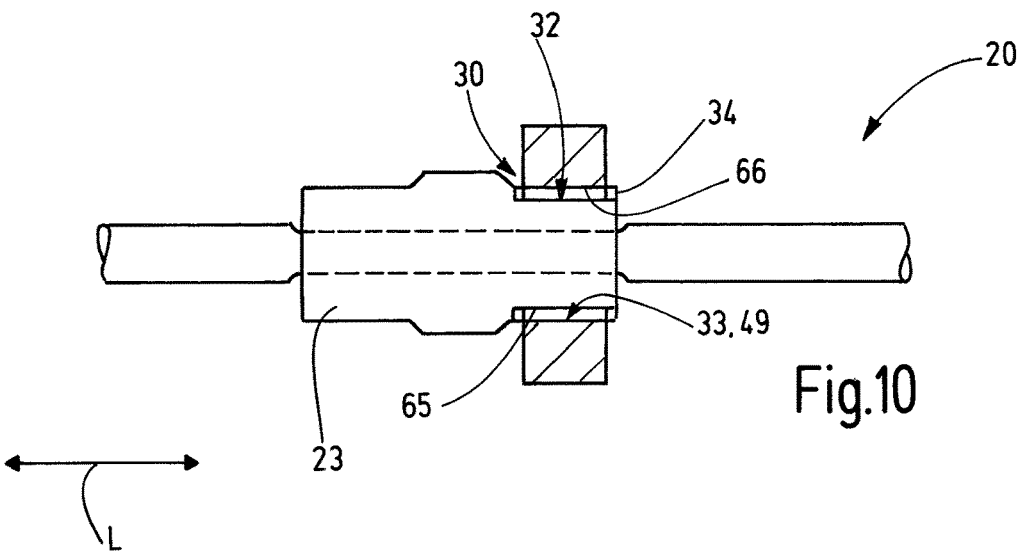
Figure 11:
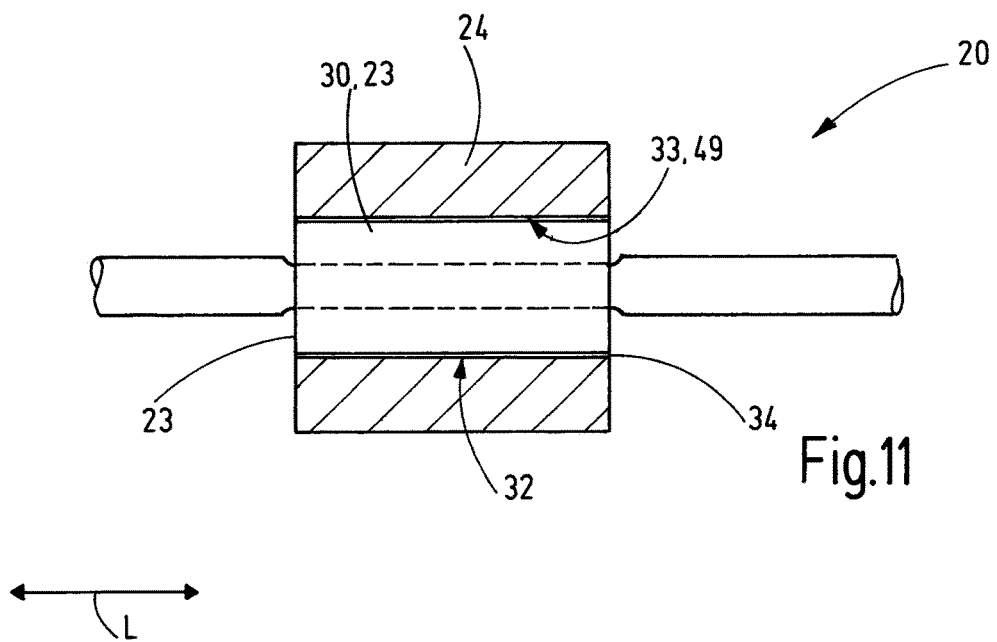

FIGS. 9-11 schematically depict further variants of the explosion-proof assembly 20 in a heavily simplified manner. In the previously described embodiment and also the exemplary embodiments in FIGS. 9 and 11, the delimiting surfaces 32, 33 are each cylindrical and preferably circular cylindrical. They are embodied as flat surfaces In the preferred exemplary embodiments these are embodied without edges and without indentations or protrusions. In a variant, it is also possible to provide an outer thread 65 on the first delimiting surface 32 and an inner thread 66 on the second delimiting surface 33. In this embodiment the connecting body 23 with the outer thread 65 is screwed into the inner thread 66 of the bushing part 24 (FIG. 10). The Ex gap 34 is embodied here as a threaded gap. This screw connection at the same time constitutes a means for securing against an undesirable relative movement in the longitudinal direction L. The securing device 52 is formed in this case by the thread 65, 66.

A modular system for an explosion-proof assembly 20 is illustrated in FIGS. 12-17. A bushing part 24 can comprise a plurality of bushing openings 48. These bushing openings 48 preferably have different cross-sectional dimensions or in accordance with the example different diameters, at least in part. Depending on the cross-section of the conductor device 21 to be guided through, a bushing opening 48 of sufficient size can be selected. Each bushing opening 48 is associated with a corresponding connecting body 23, which, following the plastic deformation of the portion outer surface 31 thereof, has a first delimiting surface 32, which is adapted to the corresponding inner diameter of the bushing surface 49—this forming the second delimiting surface 33—so that the Ex gap 34 is formed at the time of insertion (FIGS. 13-17).

For a bushing opening 48 with a predefined inner diameter it is advantageous to provide a plurality of connecting bodies 23 that have different numbers of conductor channels 29 and/or conductor channels 29 with differently sized inner diameters and/or cross-sectional contours. As a result, multiple combination possibilities can be achieved in order to guide the wide range of different conductor devices 21 through a provided bushing opening 48 in a flameproof manner. The number of these possibilities is further increased in that—as described above—a plurality of bushing openings 48 can be provided which can have different inner diameters. For example, connecting bodies 23 can thus be adapted to the guiding through of standard conductors or standard cables in that they provide one or more conductor channels 29 of appropriate number and/or size. The outer dimensions of the connecting portion 31 prior to the plastic deformation thereof are selected so that a sufficient material thickness remains for the plastic deformation depending on the size and number of the conductor channels 29. The size of the bushing openings 48 in the bushing part 24 is in turn adapted accordingly to the resultant outer dimension of the connecting part 23. Here, it can also be taken into consideration that the bushing openings 48 can be produced in the bushing part 24 in a standard size using tools (for example drills, millers or the like).

Figure 16:
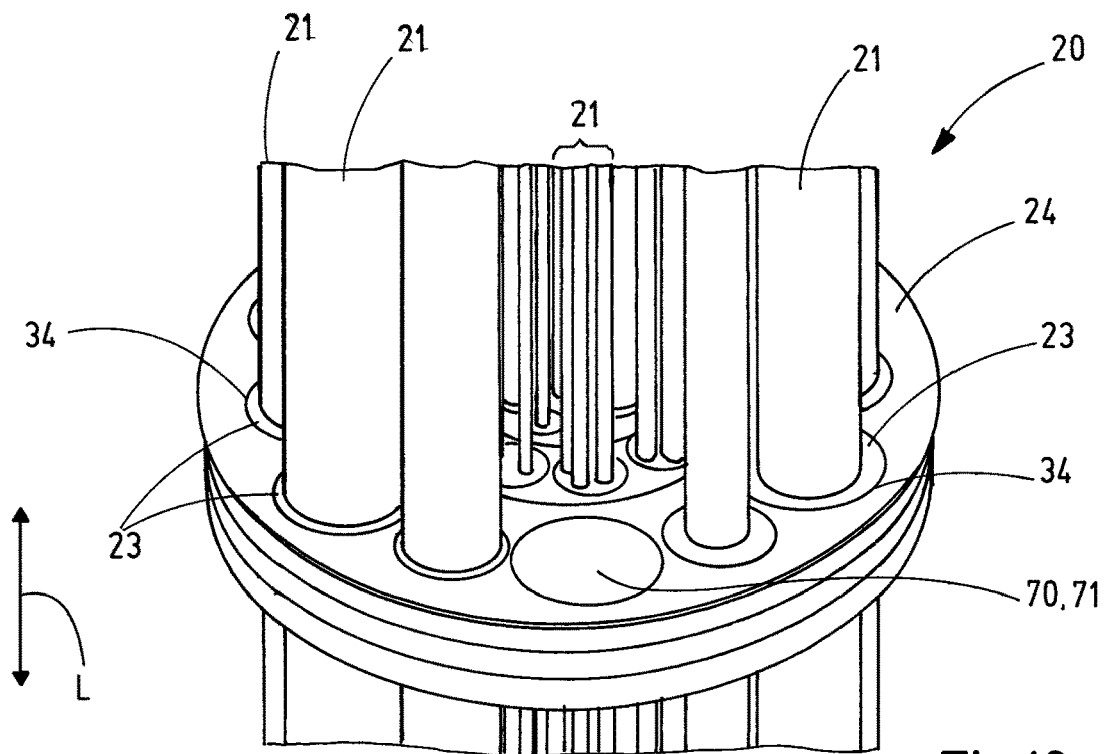
FIG. 16 is a perspective of an explosion-proof assembly with connections between the bushing parts as shown in FIG. 12-15.
Figure 17:
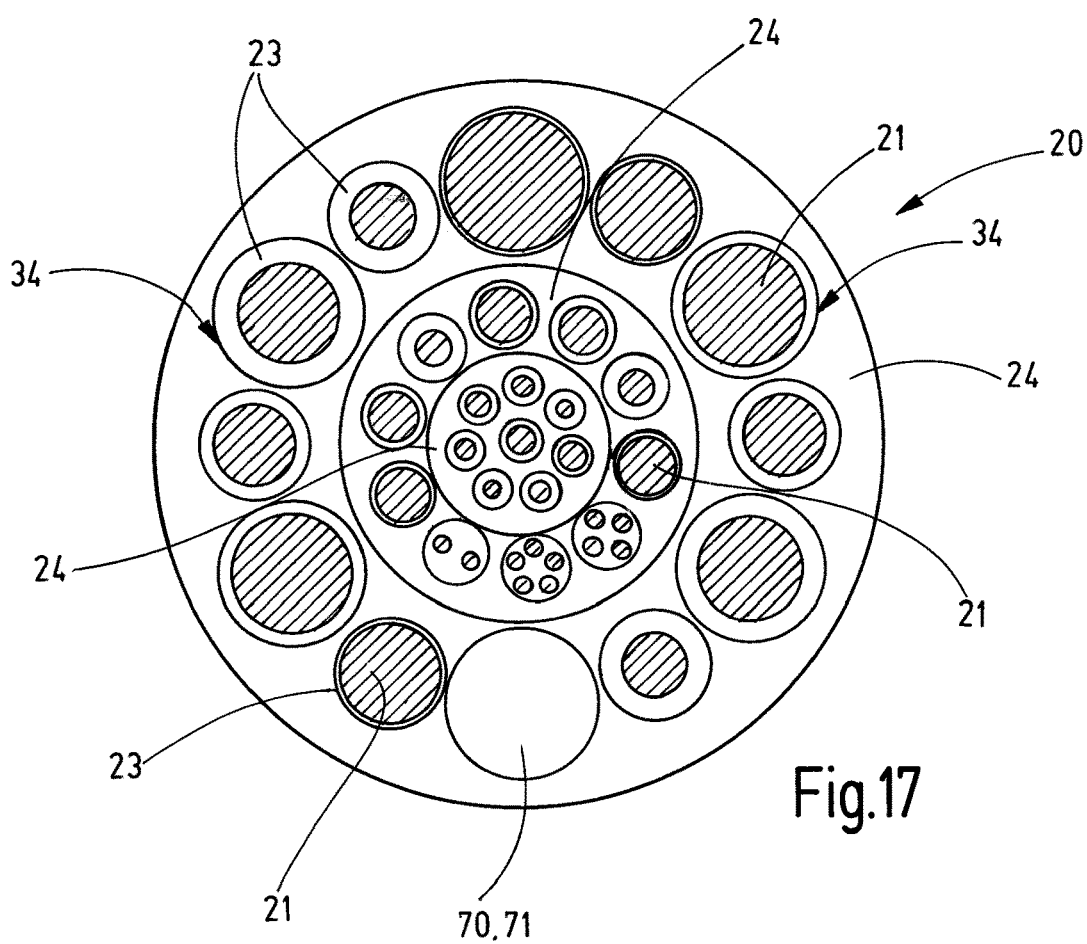
FIG. 17 is a transverse view of the bushing parts shown in FIG. 16, with the conductor devices each illustrated in cross-section.

It can be seen in FIGS. 15-17 that bushing openings 48 of this kind in the bushing part 24 that are not required for the guiding through of a conductor device 21 are closed, so as to maintain the protection against explosion. The closure of a bushing opening 48 in which there is no connecting body 23 arranged is provided in a flamegap-free manner with the aid of a closure means 70. For example, a closure stopper 71, which is preferably made of elastically deformable material and is arranged in a frictionally engaged and/or form-fitting manner in the associated bushing opening 48 is used in accordance with the example as closure means 70. Additionally or alternatively, a closure means 70 can also be fixed in the corresponding bushing opening 48 in an integrally bonded manner.

It can be seen in FIGS. 12, 16 and 17 that a plurality of bushing parts 24 that are connected or can be connected to one another can also be used for an explosion-proof assembly 20. In accordance with the example, bushing parts 24 that are arranged concentrically or coaxially relative to one another are provided and can be fitted one inside the other. The bushing parts 24 can be connected to one another in a frictionally engaged and/or form-fitting and/or integrally bonded manner in order to ensure that there is no flamegap remaining between two bushing parts 24 connected to one another.

In accordance with the example the bushing parts 24 are in the form of a circular plate or are ring-shaped. Depending on the number and/or size of the conductor devices 21 to be guided through, one or more matching bushing parts 24 is/are selected, and—if a plurality of bushing parts 24 are used—are connected to one another so that a continuous planar assembly of the bushing parts 24 is produced. A corresponding recess is produced in the wall or the wall portion, and the bushing parts 24 are arranged therein.

A plurality of conductor devices 21 can also be guided in an explosion-proof manner through a wall or a wall portion with the aid of the at least one bushing part 24 by means of this embodiment, wherein it is sufficient to provide or to form one recess in the wall or the wall portion.

The bushing part 24 can be made of metal, a metal alloy, or a plastic material, or a composite material. In one exemplary embodiment the at least one bushing part 24 is embodied as a moulded part, for example as an injection moulded part.

From the foregoing, it can be seen that an explosion-proof assembly 20 is provided which is designed to guide at least one conductor device 21 through a wall in a flameproof manner. The assembly 20 has at least one bushing part 24 with at least one bushing opening 48, which is delimited in the circumferential direction by a bushing surface 49. The at least one bushing part 24 is designed to be arranged in the wall. Each bushing opening 48 is associated with a connecting body 23, which is passed through by at least one conductor channel 29. An electrical or optical conductor 22 extends through the conductor channel 29. The conductor 22 can be provided in the region of the conductor channel 29 with a sheathing 25 and/or can be surrounded by a sleeve, for example for electrical insulation or for mechanical protection of the conductor. The connecting body 23 has a connecting portion 30, which is connected to the conductor 22 in a frictionally engaged and/or form-fitting manner by plastic deformation. Here, a first delimiting surface 32 is formed at the connecting portion 30. The bushing surface 49 constitutes a second delimiting surface 33. A flameproof Ex gap 34 is formed between the two delimiting surfaces 32, 33 by inserting the connecting portion 30 into the bushing opening 48.

LIST OF REFERENCE SIGNS 20 explosion-proof assembly
21 conductor device
22 conductor
23 connecting body
24 bushing part
24 bushing part
29 conductor channel
30 connecting portion
31 portion outer surface
32 first delimiting surface
33 second delimiting surface
34 Ex gap
37 rolling tool
38 mould
39 deformation channel
40 first end of the deformation channel
41 ram
42 second end of the deformation channel
43 chamfer
44 end face
48 bushing opening
49 bushing surface
52 securing device
53 first stop
54 hole
55 second stop
56 snap ring
57 peripheral groove
58 sleeve
61 shell of the bushing part
62 film hinge
63 thread of the bushing part
65 outer thread
66 inner thread
70 closure means
D axis of rotation
F forming force
L longitudinal direction

The invention claimed is:

1. An explosion-proof assembly (20) comprising:
an explosion-proof housing that separates a space from an atmosphere that is at risk for an explosion,
said explosion-proof housing having a wall portion,
at least one bushing part (24) having at least one bushing opening (48) which has a bushing surface (49),
at least one connecting body (23) having at least one conductor channel (29) extending through the connecting body (23) in a longitudinal direction (L),
a conductor device (21) extending through the at least one conductor channel (29) having at least one electrical and/or at least one optical conductor (22),
said at least one bushing part (24) being immovably arranged on the housing wall portion against movement in the longitudinal portion (L),
a single connecting body (23) having a connection portion (30) made of a plastically deformable material containing metal and being plastically deformed into inwardly pressing relation to the at least one conductor (22) for connecting the connecting body (23) to the conductor device (21) in a frictionally engaged manner,
said plastically deformed connecting portion (30) of said connecting body (23) forming a first delimiting surface (32) which together with a second delimiting surface (33) defined by said bushing surface (49) of the least one bushing part opening (48) form a flameproof Ex gap (34), and said first delimiting surface (32) and said second delimiting surface (33) are surfaces without indentations or protrusions.

2. The explosion-proof assembly of claim 1 in which said connecting body (23) rests directly and without a flamegap against the at least one conductor device (21).

3. The explosion-proof assembly of claim 2 in which said connecting portion (30) of the connecting body (23) engages the conductor device (21) with a flameproof connection, said first delimiting surface (32) is arranged coaxially relative to the flameproof connection between the connecting body (23) and the conductor device (21).

4. The explosion-proof assembly of claim 1 in which said conductor device (21) extend through said connecting body (23) with a flameproof encapsulation (EX d).

5. The explosion-proof assembly of claim 1 in which said flameproof Ex gap (34) is an air gap.

6. The explosion-proof assembly of claim 1 in which said first delimiting surface (32) and said second delimiting surface (33) in cross-section each has a curved contour, without vertices.

7. The explosion-proof assembly of claim 1 in which said connecting portion (30) has a length more than 70% of the length of the connecting body (23).

8. The explosion-proof assembly (20) in which said at least one bushing part (24) has a flame-proof threaded connection with said housing wall portion.

9. The explosion-proof assembly (20) of claim 1 in which said at least one bushing part (24) has a flame-proof integrally bonded connection with said housing wall portion.

10. The explosion-proof assembly of claim 1 in which said at least one bushing part (24) is an integral part of said housing wall portion.

11. The explosion-proof assembly of claim 1 in which said first delimiting surface (32) of said connecting body (23) has an outer dimension less than an inner dimension of the second delimiting surface (33) of said bushing part (24).

\* \* \* \* \*